(12) United States Patent
Na (10) Patent No.: US 8,451,293 B2
(45) Date of Patent: May 28, 2013

(54) IMAGE PROCESSING APPARATUS AND CONTROL METHOD THEREOF

(75) Inventor: Moon-sung Na, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 774 days.

(21) Appl. No.: 12/175,996

(22) Filed: Jul. 18, 2008

(65) Prior Publication Data

US 2009/0146949 A1 Jun. 11, 2009

(30) Foreign Application Priority Data

Dec. 6, 2007 (KR) ........................ 10-2007-0126295

(51) Int. Cl.
*G09G 5/00* (2006.01)
*H04N 5/45* (2011.01)
(52) U.S. Cl.
USPC ............ 345/620; 348/555; 348/564; 348/565
(58) Field of Classification Search
USPC ............ 345/3.3, 42, 56, 57, 61, 98, 157–169, 345/179–183, 694, 620; 348/555, 564, 565
See application file for complete search history.

(56) References Cited

U.S. PATENT DOCUMENTS

| | | | | |
|---|---|---|---|---|
| 6,005,549 | A  * | 12/1999 | Forest ............................ | 345/157 |
| 6,590,618 | B1 * | 7/2003  | Park et al. ..................... | 348/734 |
| 7,489,321 | B2 * | 2/2009  | Jetha et al. .................... | 345/620 |
| 2002/0013941 | A1 * | 1/2002 | Ward et al. ..................... | 725/25 |
| 2004/0056869 | A1 * | 3/2004 | Jetha et al. .................... | 345/620 |
| 2006/0221237 | A1 * | 10/2006 | Min et al. ...................... | 348/565 |
| 2007/0003221 | A1 * | 1/2007 | Hamada et al. .................. | 386/95 |
| 2007/0229706 | A1 * | 10/2007 | Watanabe et al. ............. | 348/555 |

FOREIGN PATENT DOCUMENTS

| | | |
|---|---|---|
| EP | 1675395 A1 | 6/2006 |
| KP | 10-2005-0069376 A | 7/2005 |
| KP | 100-2005-0076448 A | 7/2005 |
| KP | 10-2005-0091423 A | 9/2005 |
| KP | 10-2006-0097376 A | 9/2006 |
| KR | 10-2007-0006518 A | 1/2007 |
| WO | 00/10327 A1 | 2/2000 |

OTHER PUBLICATIONS

Communication dated Dec. 14, 2011 issued by the European Patent Office in counterpart European Patent Application No. 08170517.0.
Summons to Attend Oral Proceedings dated Dec. 17, 2010 issued by the European Patent Office in European Patent Application No. 08170517.0.
Communication dated Aug. 24, 2010, issued by the European Patent Office in counterpart European Application No. 08170517.0.

* cited by examiner

*Primary Examiner* — Quan-Zhen Wang
*Assistant Examiner* — Michael J Eurice
(74) *Attorney, Agent, or Firm* — Sughrue Mion, PLLC (57) ABSTRACT

An image processing apparatus includes: a display which displays an image through at least one screen; a processor which processes the image to be displayed on the display; a pointer adjuster which adjusts a pointer to select at least two points on the image displayed on the display; and a controller which sets a selection area by selecting a partial image displayed within a boundary including the at least two points from the image displayed on the display, and controls the processor to display the selection area on a predetermined region of the display.

15 Claims, 12 Drawing Sheets

IMAGE PROCESSING APPARATUS AND CONTROL METHOD THEREOF

CROSS REFERENCE TO RELATED APPLICATIONS

This application claims priority from Korean Patent Application No. 10-2007-0126295, filed on Dec. 6, 2007 in the Korean Intellectual Property Office, the disclosure of which is incorporated herein by reference.

BACKGROUND OF THE INVENTION

1. Field of Invention

Apparatuses and methods consistent with the present invention relate to an image processing apparatus and a control method thereof, and more particularly to an image processing apparatus capable of displaying a plurality of images on one screen, and a control method thereof.

2. Description of the Related Art

Image processing apparatuses have developed to have diverse functions, so that they can receive various video signals from a digital versatile disc (DVD) player, a set-top box, a personal computer (PC), and similar image sources as well as a broadcasting signal, and display an image based on the video signal.

Further, an image processing apparatus having a picture-in-picture (PIP) function, which can process a plurality of video signals at the same time, has been developed. The image processing apparatus with the PIP function receives and processes the plurality of video signals, and simultaneously displays a main screen and a sub screen based on the plurality of video signals. If a user executes the PIP function while watching the main screen, the sub screen is displayed as being overlapped with the main screen at a predetermined region of the main screen. The sub screen allows a user to watch a different channel from that displayed on the main screen, or an image based on a video signal received from an external source, along with the main screen at the same time.

However, a related art image processing apparatus is inconvenient for a user to select an image to be displayed on the sub screen. When a user selects an image to be displayed on the sub screen, the sub screen appears at a predetermined region of the main screen without displaying any image. A user has to use a menu for selecting a video signal to be displayed through the sub screen among the video signals from many image sources.

Further, since the sub screen is smaller than the main screen, a user cannot easily recognize an image such as a subtitle which is displayed on a predetermined region of an image displayed on the sub screen.

SUMMARY OF THE INVENTION

The present invention provides an image processing apparatus and a control method thereof, in which a user can easily select a desired part of an image to be displayed as a sub screen.

The present invention also provides an image processing apparatus and a control method thereof, in which a pointer is adjusted to select at least two points, and an image displayed within a boundary including the selected points is displayed on the sub screen, thereby allowing a user to easily utilize a PIP function.

The present invention also provides an image processing apparatus and a control method thereof, in which an image, which is displayed within a boundary including points selected by adjusting a pointer, is always displayed on a sub screen even though an input video signal is changed.

According to an aspect of the present invention, there is provided an image processing apparatus comprising: a display which displays an image through at least one screen; a processor which processes the image to be displayed on the display; a pointer adjuster which adjusts a pointer to select at least two points on the image displayed on the display; and a controller which sets a selection area by selecting a partial image displayed within a boundary including the at least two points from the image displayed on the display, and controls the processor to display the selection area on a predetermined region of the display.

The pointer adjuster may select the at least two points by dragging and dropping the pointer on the display.

The pointer adjuster may comprise a pointing device.

The image processing apparatus may further comprise: a receiver to receive different video signals corresponding to different channels; and a channel selector to change a channel, wherein the processor comprises a PIP processor to process the different video signals to be displayed on a first screen and a second screen, and the controller, when the channel is changed, controls the PIP processor to display an image corresponding to the changed channel through the first screen, and displays an image on the selection area on the second screen.

The image processing apparatus may further comprise a user interface (UI) generator, wherein the controller controls the UI generator to generate a display setup menu for setting whether to display the selection area on a predetermined region of the display.

The controller may control the UI generator to generate a position adjusting menu to adjusting a display position of the second screen.

The controller may control the UI generator to generate a signal shifting menu to make the first and second screens interchange images displayed thereon with each other.

The controller may control the UI generator to generate a screen changing menu to display an image of the second screen on the first screen.

According to another aspect of the present invention, there is provided an image processing apparatus comprising: a display which displays an image on at least one screen; a processor which processes the image to be displayed on the display; a pointer adjuster which drags and drops a pointer to select a part of an image displayed on the display; and a controller which sets a partial image, selected by dragging and dropping the pointer, as a selection area, and controls the processor to display the selection area on a predetermined region of the display.

According to another aspect of the present invention, there is provided a method of controlling an image processing apparatus with a display to display an image on at least one screen, the method comprising: receiving at least one video signal; processing and outputting the received video signal to the display; adjusting a pointer to select at least two points on the image displayed on the display; setting a selection area by selecting a partial image displayed within a boundary including the at least two points from the image displayed on the display; and displaying the selection area on a predetermined region of the display.

The at least two points may be selected by dragging and dropping the pointer on the display.

The at least two points may be selected by a pointing device.

The method may further comprise: changing a channel, wherein the method further comprises displaying a video signal corresponding to the changed channel through a first screen of the display, and displaying an image displayed on the selection area through a second screen.

The displaying the selection area on a predetermined region of the display may comprise setting whether to display the selection area.

The method may further comprise adjusting a display position of the second screen.

The method may further comprise interchanging an image displayed on the first screen with an image displayed on the second screen.

The method may further comprise displaying an image of the second screen on the first screen.

According to another aspect of the present invention, there is provided a method of controlling an image processing apparatus with a display to display an image on at least one screen, the method comprising: receiving at least one video signal; processing and outputting the received video signal to the display; dragging and dropping a pointer to select a part of an image displayed on the display; setting a partial image, selected by dragging and dropping the pointer, as a selection area; and displaying the selection area on a predetermined region of the display.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the Figures.

Figure 1:
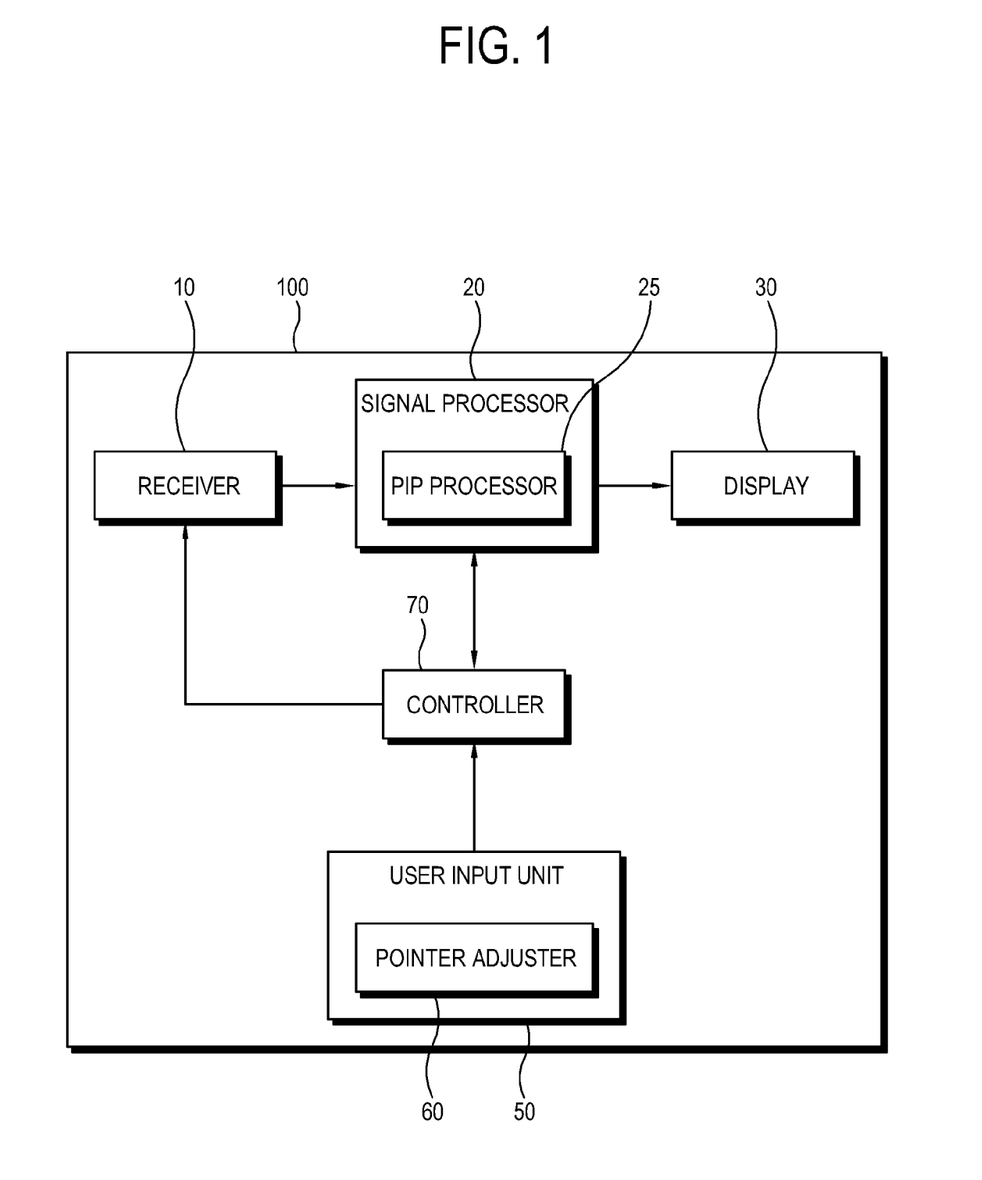
FIG. 1 is a control block diagram of an image processing apparatus according to an exemplary embodiment of the present invention.

FIG. 1 is a control block diagram of an image processing apparatus according to an exemplary embodiment of the present invention. As shown in FIG. 1, an image processing apparatus 100 includes a receiver 10, a signal processor 20, a display 30, a user input unit 50, and a controller 70.

The receiver 10 includes a tuner unit (not shown) and a connector unit (not shown). The tuner unit includes at least one tuner (not shown) to be tuned to a channel frequency corresponding to a predetermined channel so as to receive an analog broadcasting signal or a digital broadcasting signal. According to an exemplary embodiment of the present invention, the tuner unit may include a plurality of tuners to receive a plurality of broadcasting signals, respectively. Alternatively, the tuner unit may include a multi-tuner to receive the plurality of broadcasting signals.

Here, the tuner unit may include a demodulator (not shown) for demodulating a tuned signal, a decoder, a multiplexer, etc. The tuner unit (not shown) is tuned to a channel frequency corresponding to a tuning control signal of the controller 70 (described in detail below), thereby receiving a corresponding broadcasting signal.

If the broadcasting signal of the channel tuned by the tuner is the digital broadcasting signal, the broadcasting signal may be received in the form of a transport stream obtained by time-division multiplexing a video signal, an audio signal and other data. For example, the demodulator makes the received broadcasting signal undergo vestigial side band (VSB) demodulation and error correction, and outputs it in the form of the transport stream.

The connector unit connects with an external device such as a video cassette recorder (VCR), a DVD player, etc. through a cable, and receives a video signal from the external device. Preferably, but not necessarily, the connector unit includes diverse terminals to receive video signals of various formats. For example, the connector unit may include a D-sub terminal, a composite video base band signal (CVBS) terminal, an S-video terminal, a component terminal, etc. to receive the video signals.

The signal processor 20 processes the video signal received through the receiver 10 under control of the controller 70. Further, the signal processor 20 converts the received video signal to have a format, which is displayable as an image in the display 30. For example, the signal processor 20 converts the received video signal into digital red, green and blue (RGB) signals and outputs them to the display 30.

The signal processor 20 may have various functions corresponding to the formats of the received video signal. For example, the signal processor 20 may have an analog-to-digital (A/D) converting function to convert the video signals having various formats into the digital video signals having a certain format; a digital decoding function; a scaling function to adjust a vertical frequency, a resolution, an aspect ratio, etc. of the received digital and/or analog video signal to be proper to the display 30; and a predetermined format conversion function.

The signal processor 20 may include a PIP processor for processing a plurality of images to be displayed on a plurality of screens of the display 30 at the same time. The PIP processor 25 processes a first video signal to be displayed on a first screen, and a second video signal to be displayed on a second screen. The second screen is displayed while overlapping with a predetermined region of the first screen. The PIP processor 25 may include a plurality of processing modules or a single processing module so as to process the plurality of video signals.

The display 30 may include a digital light processing (DLP), a liquid crystal display (LCD), a plasma display panel (PDP), or the like to display images processed by the signal processor 20 on at least one screen thereof. Further, the display 30 may be provided separately from the image processing apparatus 100.

The user input unit 50 includes at least one key or the like to change the channels, a menu key, and a key signal generator to generate a key signal corresponding to key-manipulation. In addition, the user input unit 50 may include a function key to set the function of the image processing apparatus 100, an option key, and the like.

Figure 2:
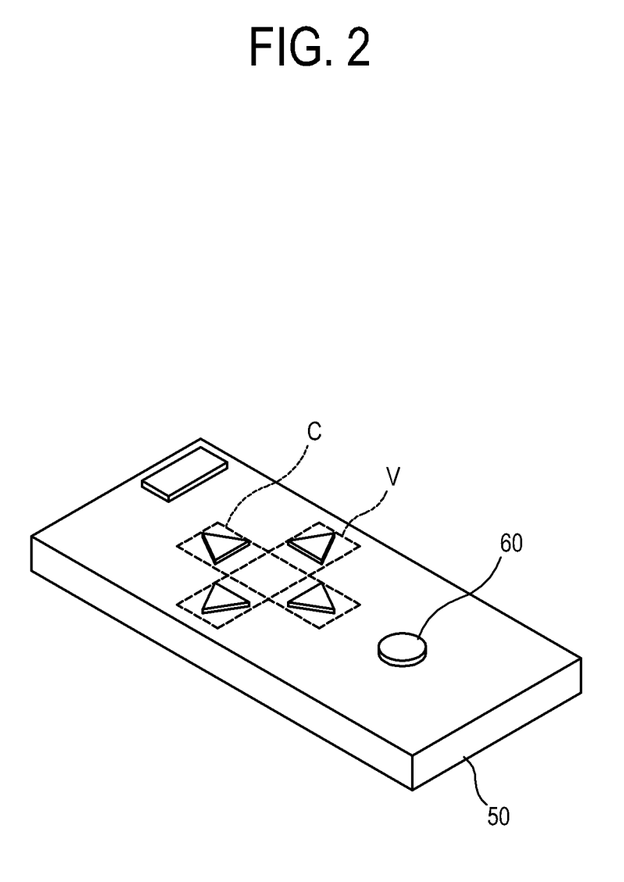
FIG. 2 is a perspective view of a user input unit provided with a pointer adjuster according to an exemplary embodiment of the present invention.

According to an exemplary embodiment of the present invention, the user input unit 50 may include a channel selector C for selecting the channels, and a volume controller V for controlling volume, as shown in FIG. 2. Further, the user input unit 50 includes a pointer adjuster 60 to adjust a pointer displayed on the display 30.

Figure 3:
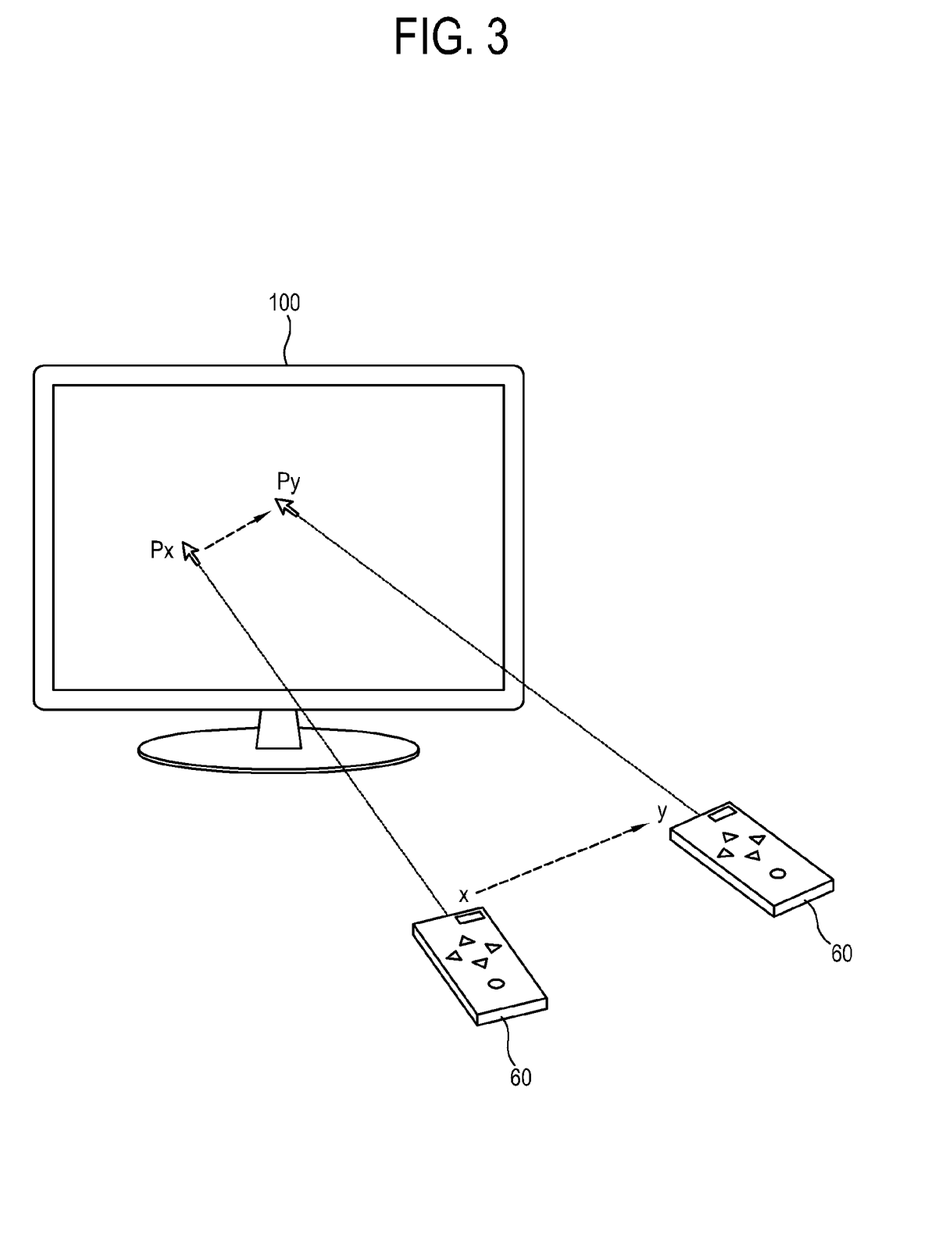
FIG. 3 illustrates that a pointer is moved by the pointer adjuster according to an exemplary embodiment of the present invention.

The pointer adjuster 60 may include a pointing device that moves the pointer displayed on the display 30 and has a sensor. When a user moves the pointer adjuster 60, the pointer displayed on the display 30 moves corresponding to the movement of the pointer adjuster 60. Referring to FIG. 3, when a user moves the pointer adjuster 60 from a point x to a point y, the pointer moves from a point Px to a point Py corresponding to the movement of the pointer adjuster 60. Thus, a user easily moves the pointer.

The pointer adjuster 60 sets a selection area by selecting at least two points on the image displayed on the display. In other words, one point where the pointer is positioned is selected, and then another point to which the pointer is moved after moving the pointer adjuster 60 is selected. A partial image displayed within a boundary including the selected two-points may be set as the selection area.

Alternatively, the pointer may be dragged and dropped in selecting the at least two points. A user drags the pointer while clicking the pointer adjuster 60, and drops the pointer by releasing the click of the pointer adjuster 60. The selection area is set from a point where the pointer adjuster 60 is selected to a point where the pointer adjuster 60 is released.

The controller 70 controls the selection area selected by the pointer adjuster 60 to be displayed on a predetermined region of the display 30. Here, the controller 70 may be a central processing unit, a microcomputer, or the like.

The controller 70 according to an exemplary embodiment of the present invention will now be described with reference to FIGS. 4A through 4D.

Figure 4A:
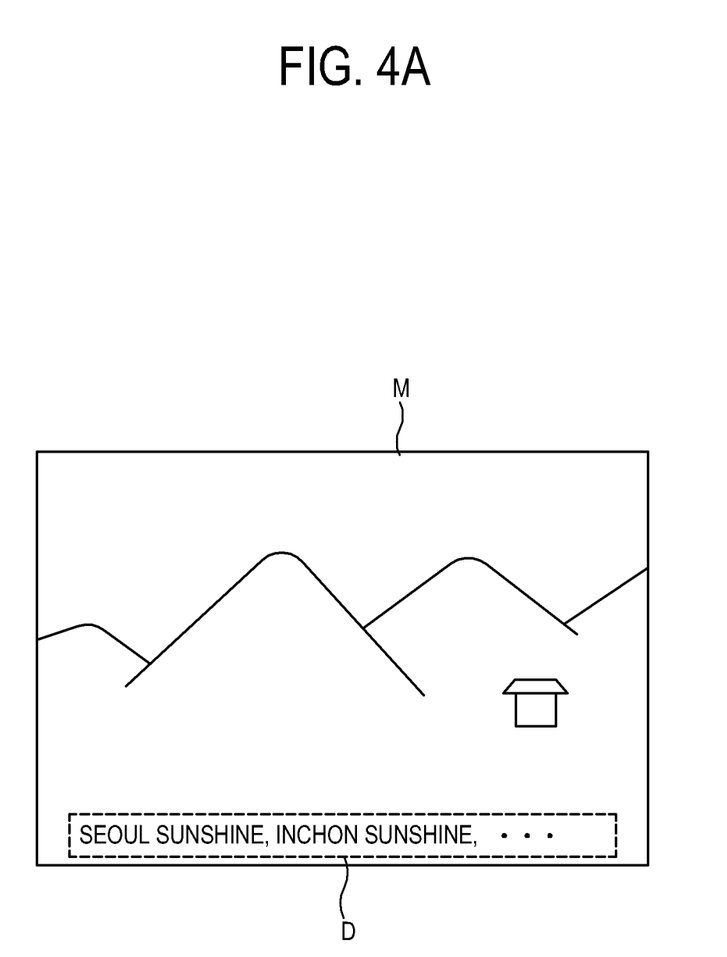
FIGS. 4A through 4D illustrate a process of setting a second screen according to an exemplary embodiment of the present invention.

As shown in FIG. 4A, the controller 70 controls the first video signal to be processed and displayed on a first screen M of the display 30 when it receives the first video signal. The first screen M is the whole screen area of the display 30 where an image is displayable. A first image to be displayed on the first screen M may include a subtitle D.

Figure 4B:
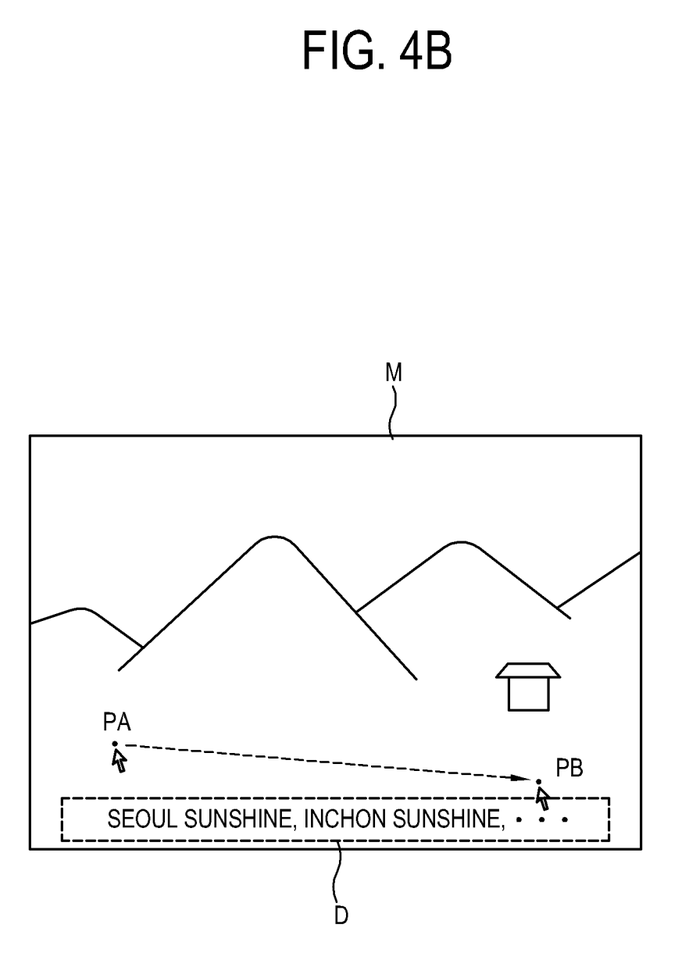
Figure 4C:
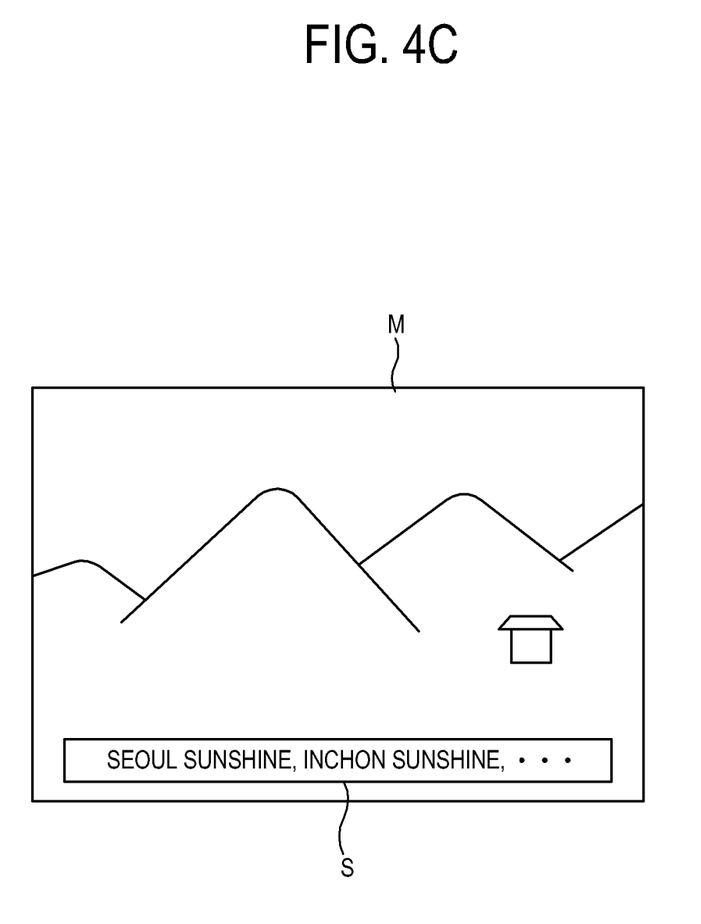

Using the pointer adjuster 60, a user selects a region where the subtitle D is displayed. For example, as shown in FIG. 4B, the pointer adjuster 60 is clicked when positioning the pointer at a point PA near the subtitle D on the first screen M. Then, the pointer adjuster 60 is clicked again after moving the pointer from the point PA to a point PB on the first screen M. The controller 70 sets the selection area with a predetermined image displayed within a boundary including the selected points PA and PB. As shown in FIG. 4C, the controller 70 controls the PIP processor 25 to display the selection area as a second screen S on a predetermined region of the first screen M.

Figure 4D:
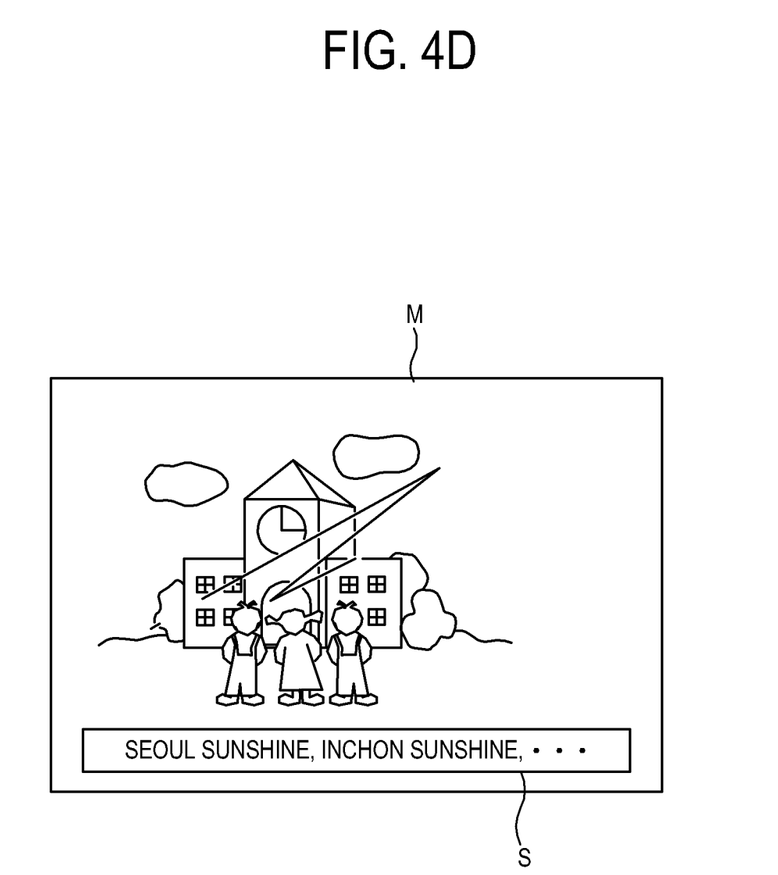

At this time, if a user changes the channel through the channel selector C, a second video signal is received corresponding to the changed channel. As shown in FIG. 4D, the controller 70 controls the PIP processor 25 to process the second video signal to be displayed on the first screen M. Even though the first image displayed on the first screen M is changed to a second image, an image such as the subtitle D of the first image, which is being displayed on the second screen S, is maintained.

Alternatively, the pointer may be dragged and dropped in selecting at least two points through the pointer adjuster 60. Referring to FIG. 4B, a user drags the pointer from the point PA near the subtitle D on the first screen M while clicking the pointer adjuster 60. When the pointer is dragged to the point PB, the click of the pointer adjuster 60 is released. Thus, the controller 70 sets the selection area by dragging the pointer from the point PA and dropping the pointer at the point PB.

Below, a method of controlling the image processing apparatus 100 will be described with reference to the flowchart of FIG. 8.

Figure 8:
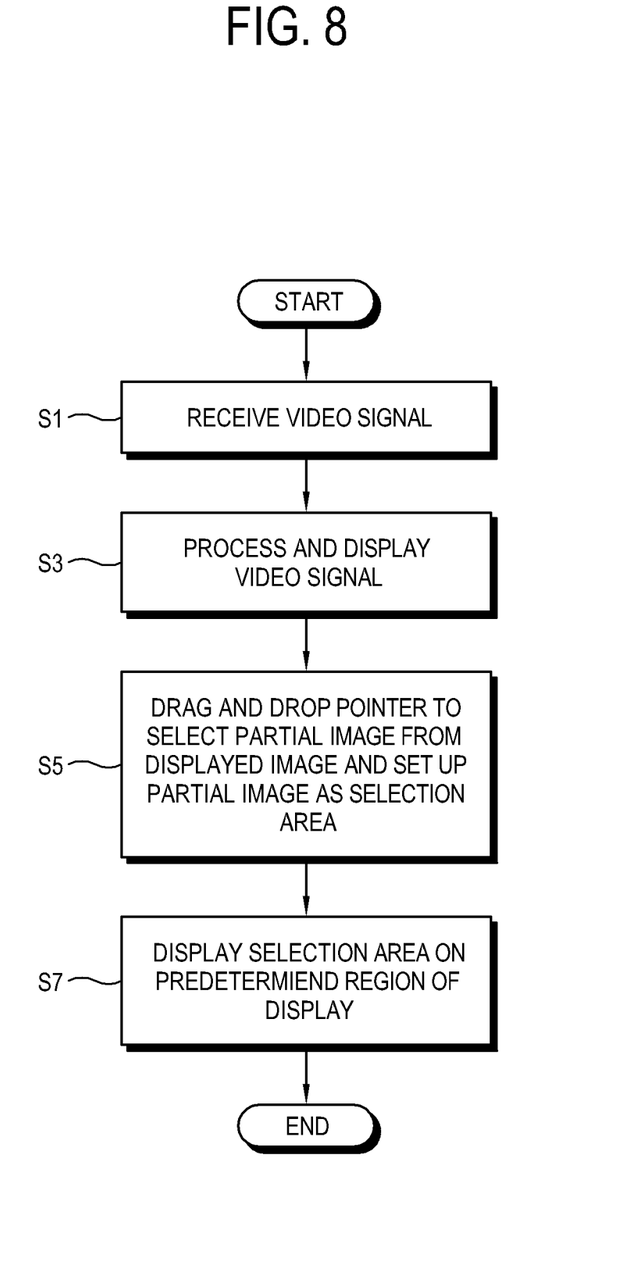
FIG. 8 is a flowchart of controlling an image processing apparatus according to an exemplary embodiment of the present invention.

As shown in FIG. 8, when a video signal is received at operation S1, the controller 70 processes the video signal to be displayed on the first screen at operation S3.

At operation S5, an image displayed within a boundary including at least two points selected by the pointer is set as the selection area.

At operation S7, the controller 70 controls the PIP processor 25 to process the selection area to be displayed as the second screen on a predetermined region of the display 30.

Accordingly, a user easily selects an image to be displayed on the second screen by dragging and dropping the pointer. Further, even though the input video signal is changed, the image being displayed on the selection area, which is set by dragging and dropping the pointer, is still displayed on the second screen. Also, the image to be displayed on the second screen is easily selected, so that it is convenient for a user.

Below, another exemplary embodiment of the present invention will be described with reference to FIGS. 5 and 6. Repetitive descriptions of similar elements to those of the exemplary embodiment shown in FIG. 1 will be avoided as necessary.

Figure 5:
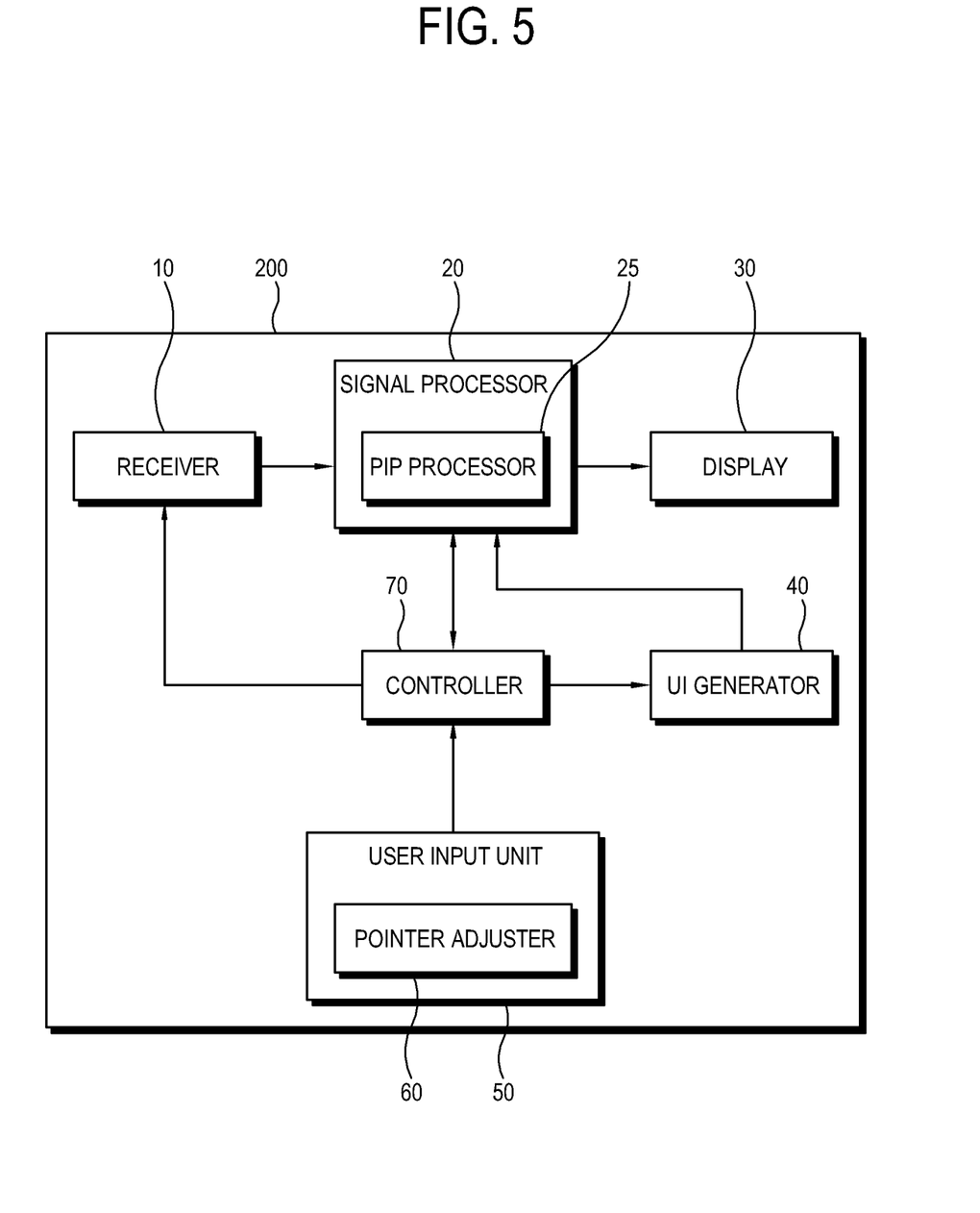
FIG. 5 is a control block diagram of an image processing apparatus according to another exemplary embodiment of the present invention.

The image processing apparatus 200 according to the exemplary embodiment includes a UI generator 40 as shown in FIG. 5.

Under control of the controller 70, the UI generator 40 generates a UI menu. The UI generator 40 may include an on screen display (OSD) chip. The UI generator 40 may be involved in the signal processor 20 or the controller 70. In this embodiment, the UI generator 40 generates a display setup menu for setting whether to display the selection area.

Figure 6:
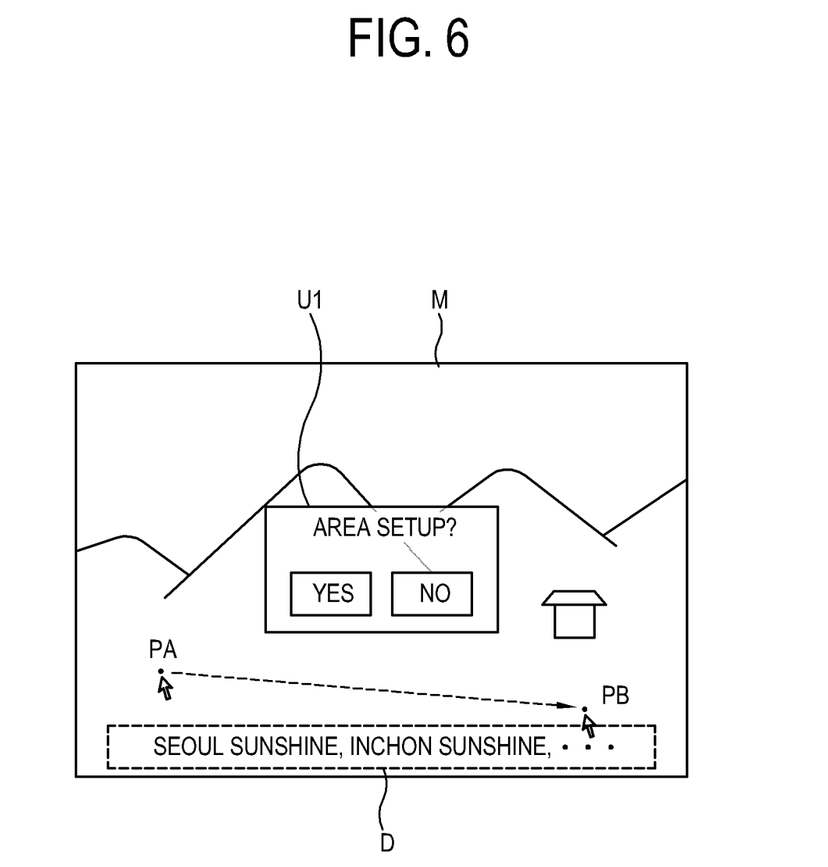
FIG. 6 illustrates a display setting menu according to an exemplary embodiment of the present invention.

Referring to FIG. 6, if the points PA and PB are selected by adjusting the pointer, the controller 70 sets the selection area based on the points PA and PB. The controller 70 controls the UI generator 40 to generate the display setup menu U1 to receive selection about whether to display the selection area on a predetermined region of the first screen.

Through the display setup menu U1, if a user selects the selection area to be displayed, the area of the selection area is displayed on the second screen as shown in FIG. 4C.

Thus, a user can easily select an image to be displayed through the second screen. Also, a user can confirm whether to display the selection area as the second screen, so that a user can precisely set the selection area as desired.

Figure 7A:
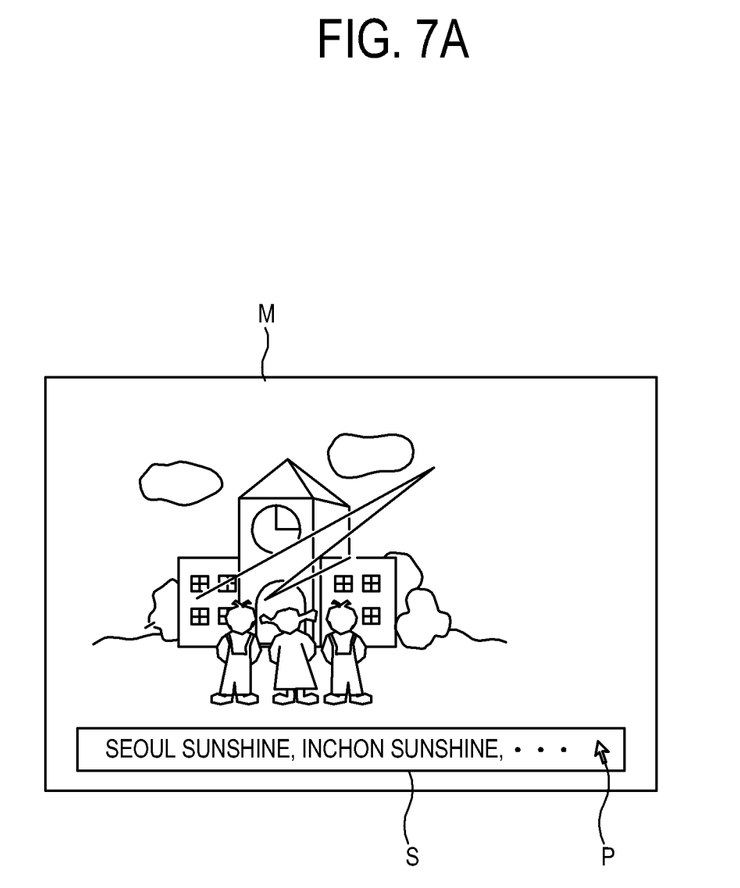
FIGS. 7A and 7B illustrate the display setting menu according to an exemplary embodiment of the present invention.
Figure 7B:
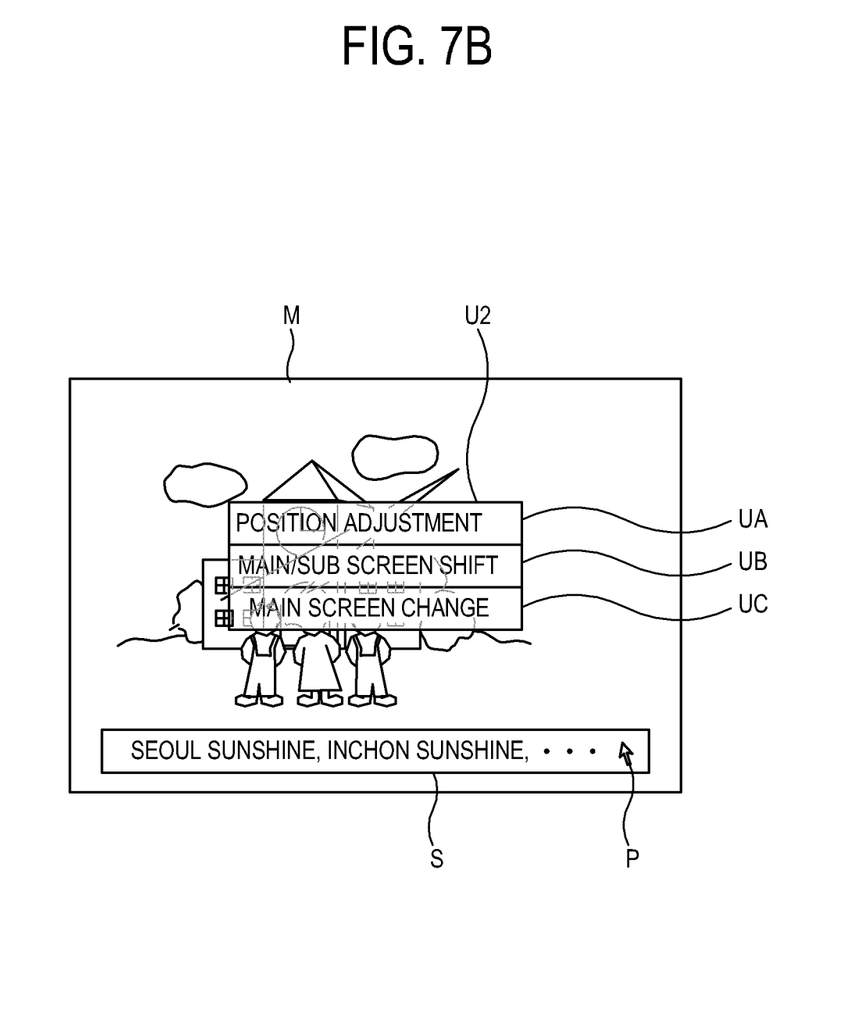

Below, another exemplary embodiment of the present invention will be described with reference to FIGS. 5, 7A, and 7B. In this exemplary embodiment, repetitive descriptions of similar elements to those of the previously-described exemplary embodiments will be avoided as necessary.

If the pointer is positioned on the second screen, the controller 70 may control the UI generator 40 to generate a display adjustment menu U2 to adjust the second screen. As shown in FIG. 7A, a user clicks the pointer adjuster 60 in the state that the pointer is positioned on the second screen. The controller 70 controls the UI generator 40 to generate the display adjust menu U2 having a position adjusting menu UA, a signal shifting menu UB and a screen changing menu UC (as shown in FIG. 7B).

When the position adjusting menu UA is selected from the display adjustment menu U2, the controller 70 adjusts the position of the second screen. Here, a user may adjust the position of the second screen by dragging and dropping the pointer.

When the signal shifting menu UB is selected, the controller 70 controls the first screen and the second screen to interchange images being displayed thereon with each other. In other words, the image of the first screen is displayed on the second screen, and the image of the second screen is displayed on the first screen.

When the screen changing menu UC is selected, the controller 70 controls the image of the second screen to be displayed on the first screen and eliminates the second screen.

Accordingly, it is convenient for a user to adjust the position of the second screen, to change the screen and to shift the signals, etc.

As described above, the present invention provides an image processing apparatus and a control method thereof, in which a user can easily select a desired part of an image to be displayed on a sub screen.

Further, the present invention provides an image processing apparatus and a control method thereof, in which a drag-and-drop function or the like of a pointer is used to select only at least two points, and an image displayed within a boundary including the selected points is displayed on a sub screen, thereby allowing a user to easily utilize a PIP function.

Also, the present invention provides an image processing apparatus and a control method thereof, in which an image, which is displayed within a boundary including points selected by adjusting a pointer, is always displayed on a sub screen even though an input video signal is changed.

In addition, the present invention provides an image processing apparatus which is convenient for a user to select an image to be displayed on a sub screen, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
a processor which processes a first image corresponding to a first channel to be displayed;
a display which displays the first image on a first screen;
a pointer adjuster which adjusts a pointer to select at least two points on the first image displayed on the first screen; and
a controller which sets a selection area by selecting a partial image displayed within a boundary including the at least two points from the first image displayed on the first screen, controls a user interface generator to generate a display setup menu for setting whether to display the selection area on a region of the first screen and to display the display setup menu on the first screen, and controls the processor to display the selection area as a second screen on the region of the first screen if the display setup menu is selected to display the selection area,
wherein when the first channel is changed to a second channel, the controller controls the processor to display a second image corresponding to the second channel on the first screen while displaying the selected partial image of the first image on the second screen, and
wherein the controller controls the user interface generator to generate a display adjustment menu for adjusting the selection area displayed as the second screen if the pointer is positioned on the second screen.

2. The image processing apparatus according to claim 1, wherein the display adjustment menu includes a position adjusting menu to adjust a display position of the second screen.

3. The image processing apparatus according to claim 1, wherein the display adjustment menu includes a signal shifting menu to make the first and second screens interchange images displayed thereon with each other.

4. The image processing apparatus according to claim 1, wherein the display adjustment menu includes a screen changing menu to display an image of the second screen on the first screen.

5. The image processing apparatus according to claim 1, wherein the pointer adjuster selects the at least two points by dragging and dropping the pointer.

6. The image processing apparatus according to claim 5, wherein the pointer adjuster comprises a pointing device.

7. The image processing apparatus according to claim 6, further comprising:
a receiver which is configured to receive different video signals corresponding to different channels including the first channel and the second channel; and
a channel selector which is configured to change the first channel to the second channel,
the first screen and the second screen.

8. An image processing apparatus comprising:
a processor which processes a first image corresponding to a first channel to be displayed;
a display which displays the first image on a first screen;
a pointer adjuster which drags and drops a pointer to select a part of the first image displayed on the first screen; and
a controller which sets a partial image of the first image, selected by dragging and dropping the pointer, as a selection area, controls a user interface generator to generate a display setup menu for setting whether to display the selection area on a region of the first screen and to display the display setup menu on the first screen, and controls the processor to display the selection area as a second screen on the region of the first screen if the display setup menu is selected to display the selection area,
wherein when the first channel is changed to a second channel, the controller controls the processor to display a second image corresponding to the second channel on the first screen while displaying the selected partial image of the first image on the second screen, and
wherein the controller controls the user interface generator to generate a display adjustment menu for adjusting the selection area displayed as the second screen if the pointer is positioned on the second screen.

9. A method of controlling an image processing apparatus with a display to display an image, the method comprising:
receiving at least one video signal;
processing and outputting the received video signal to the display;
dragging and dropping a pointer to select a part of a first image of the video signal displayed on a first screen of the display;
setting a partial image of the first image, selected by dragging and dropping the pointer, as a selection area;

generating a display setup menu for setting whether to display the selection area on a region of the first screen and displaying the display setup menu on the first screen;

displaying the selection area as a second screen on the region of the first screen if the display setup menu is selected to display the selection area; and generating a display adjustment menu for adjusting the selection area displayed as the second screen and displaying the display adjust menu on the first screen if the pointer is positioned on the second screen, wherein when a first channel corresponding to the first image is changed to a second channel, the displaying further comprises displaying a second image corresponding to the second channel on the first screen while displaying the selected partial image of the first image on the second screen.

10. A method of controlling an image processing apparatus with a display to display an image, the method comprising:

receiving at least one video signal;

processing and outputting the received video signal to the display;

adjusting a pointer to select at least two points on a first image of the received video signal displayed on a first screen of the display;

setting a selection area by selecting a partial image displayed within a boundary including the at least two points from the first image displayed on the first screen;

generating a display setup menu for setting whether to display the selection area on a region of the first screen and displaying the display setup menu on the first screen;

displaying the selection area as a second screen on the region of the first screen if the display setup menu is selected to display the selection area; and generating a display adjustment menu for adjusting the selection area displayed as the second screen and displaying the display adjustment menu on the first screen if the pointer is positioned on the second screen, wherein when a first channel corresponding to the first image is changed to a second channel, the displaying further comprises displaying a second image corresponding to the second channel on the first screen while displaying the selected partial image of the first image on the second screen.

11. The method according to claim 10, further comprising adjusting a display position of the second screen.

12. The method according to claim 10, further comprising interchanging an image displayed on the first screen with an image displayed on the second screen.

13. The method according to claim 10, further comprising displaying an image of the second screen on the first screen.

14. The method according to claim 10, wherein the at least two points are selected by dragging and dropping the pointer.

15. The method according to claim 14, wherein the at least two points are selected by a pointing device.

* * * * *